US 10,465,845 B2

(12) United States Patent
Conley

(10) Patent No.: US 10,465,845 B2
(45) Date of Patent: Nov. 5, 2019

(54) LUBRICATION SYSTEM WITH SUPPLY LINE MONITORING

(71) Applicant: Lincoln Industrial Corporation, St. Louis, MO (US)

(72) Inventor: Paul Conley, St. Charles, MO (US)

(73) Assignee: Lincoln Industrial Corporation, St. Louis ( * ) Notice: Subject to any disclaimer, the term of this patent is extended or adjusted under 35 U.S.C. 154(b) by 293 days.

(21) Appl. No.: 15/304,680

(22) PCT Filed: Apr. 17, 2015

(86) PCT No.: PCT/US2015/026481
§ 371 (c)(1),
(2) Date: Oct. 17, 2016

(87) PCT Pub. No.: WO2015/161258
PCT Pub. Date: Oct. 22, 2015

(65) Prior Publication Data
US 2017/0038003 A1    Feb. 9, 2017

Related U.S. Application Data

(60) Provisional application No. 61/981,057, filed on Apr. 17, 2014.

(51) Int. Cl.
*F16N 29/02*    (2006.01)
*F16N 7/38*    (2006.01)
*F16N 11/00*    (2006.01)

(52) U.S. Cl.
CPC ............. *F16N 29/02* (2013.01); *F16N 7/385* (2013.01); *F16N 11/00* (2013.01); *F16N 2250/04* (2013.01); *F16N 2250/08* (2013.01); *F16N 2260/18* (2013.01); *F16N 2280/02* (2013.01)

(58) Field of Classification Search
CPC .......... F16N 29/02; F16N 7/385; F16N 11/00; F16N 2250/04; F16N 2250/08; F16N 2260/18; F16N 2280/02
See application file for complete search history.

(56) References Cited

U.S. PATENT DOCUMENTS

| 6,179,597 B1 * | 1/2001 | Ito ........................ B29C 45/83 425/107 |
| 6,705,432 B2 * | 3/2004 | Conley ................... F16N 25/02 184/29 |
| 9,212,779 B2 * | 12/2015 | Conley ..................... F16N 7/14 |

(Continued)

FOREIGN PATENT DOCUMENTS

WO    WO-2010077282 A1 *  7/2010  .......... F16C 33/6662

*Primary Examiner* — Michael A Riegelman
(74) *Attorney, Agent, or Firm* — Mark Ussai; SKF USA Inc. Patent Dept.

(57) ABSTRACT

A lubrication system includes a lubricant supply reservoir, a supply line connecting the reservoir with one or more dispenser valves, a return valve and a pump. A control is operatively connected with a pump and with the return valve, the control being configured to operate the pump and the return valve such that a quantity of lubricant within the supply line flows out of the supply line and into the reservoir when a period of storage within the supply line of the quantity of lubricant exceeds an estimated period of effectiveness of the quantity of lubricant or a predetermined portion of the estimated lubricant effectiveness period.

15 Claims, 7 Drawing Sheets

(56) References Cited

U.S. PATENT DOCUMENTS

| | | | |
|---|---|---|---|
| 2010/0058808 A1* | 3/2010 | Felgenhauer | C03B 9/403 65/26 |
| 2012/0134847 A1* | 5/2012 | Conley | F16N 7/14 417/15 |
| 2012/0152376 A1* | 6/2012 | He | G01F 1/56 137/487.5 |
| 2012/0247876 A1* | 10/2012 | Kreutzkamper | F16N 7/385 184/26 |
| 2013/0168188 A1* | 7/2013 | Donovan | F16N 7/14 184/6 |
| 2013/0253855 A1* | 9/2013 | He | G01N 11/08 702/50 |
| 2013/0277147 A1* | 10/2013 | Conley | F16N 7/385 184/6 |
| 2015/0107329 A1* | 4/2015 | Conley | F16N 29/00 73/7 |
| 2015/0176762 A1* | 6/2015 | Conley | F16N 29/02 417/43 |
| 2016/0169448 A1* | 6/2016 | Holman | F04B 17/03 184/6.4 |
| 2016/0178121 A1* | 6/2016 | Conley | F16N 29/02 184/26 |
| 2016/0178122 A1* | 6/2016 | Conley | F16C 33/6659 184/26 |
| 2016/0186811 A1* | 6/2016 | Conley | F16N 29/02 184/6.1 |
| 2016/0186812 A1* | 6/2016 | Conley | F16N 29/02 184/6.1 |
| 2016/0290848 A1* | 10/2016 | Conley | F16N 31/00 |
| 2017/0037903 A1* | 2/2017 | Conley | F16C 33/6607 |
| 2017/0038003 A1* | 2/2017 | Conley | F16N 7/385 |
| 2017/0113315 A1* | 4/2017 | Bangma | B23Q 11/1046 |
| 2017/0114957 A1* | 4/2017 | Conley | F16N 29/02 |

\* cited by examiner

LUBRICATION SYSTEM WITH SUPPLY LINE MONITORING

BACKGROUND OF THE INVENTION

The present invention relates to lubrication systems, in particular automatic lubrication systems for lubricating machine components Lubrication systems are known and typically contain a reservoir containing lubricant, one or more fluid supply lines for transporting the lubricant to a location to be lubricated, such as a machine component (e.g., a bearing) and a pump or other means to initiate flow from the reservoir, through the fluid lines and to the component to be lubricated. In certain systems, a valve controls flow from the supply line to the machine component and a controller is provided to operate the pump and open the valve(s). Typically, the controller will start the pump at a set time interval, open the one or more valves and then close the valves and stop the pump when all machine components have received re-lubrication.

However, with lubrication systems for lubricating numerous separate machine components that are spaced a substantial distance apart, the lubricant may be disposed within or reside in the supply line for a substantial period of time. Particularly when the lubricant is grease, the lubricant may break-down and become ineffective after residing in the supply line for a prolonged period, which could lead to failure of machine components if the lubricant is dispensed thereon. More specifically, the grease will degrade over time and become ineffective to prevent metal-to-metal contact between the lubricated components, as grease tends to lose consistency, such that oil in the grease bleeds out, and/or oxidizes and breaks down, so as to be generally incapable of providing a film thickness. Such degradation increases at elevated temperatures and higher speeds of the lubricated components, so as to decrease the effective "life" of the grease.

SUMMARY OF THE INVENTION

In one as aspect, the present invention is a lubrication system for lubricating at least one movable machine component. The system comprises a lubricant reservoir containing lubricant, a dispenser line having an outlet for discharging lubricant on or within the machine component, and a dispenser valve selectively permitting lubricant flow through the dispenser line. A supply line is fluidly coupled with the reservoir and with the dispenser line and a return valve selectively permits lubricant flow from the supply line to the reservoir. A pump is fluidly coupled with the supply line and is configured to pump lubricant from the reservoir and through the supply line, and a control is operatively connected with the pump and with the return valve. The control is configured to operate the pump and the return valve such that a quantity of lubricant within the supply line flows out of the supply line and into the reservoir when a period of storage within the supply line of the quantity of lubricant exceeds an estimated period of effectiveness of the quantity of lubricant or a predetermined portion of the estimated lubricant effectiveness period.

In another aspect, the present invention is also a method of operating a lubrication system for lubricating at least one movable machine component, the system including a lubricant reservoir, a dispenser line having an outlet for discharging lubricant on or within the machine component, a dispenser valve selectively permitting lubricant flow through the dispenser line, a supply line fluidly coupled with the reservoir and with the dispenser line, a return valve selectively permitting lubricant flow from the supply line to the reservoir, and a pump for pumping lubricant and through the supply line. The method comprises the steps of: monitoring time of storage of a quantity of lubricant within the supply line; comparing the lubricant storage time with an estimated period of effectiveness of the quantity of lubricant; and operating the pump and opening the return valve when the storage period exceeds an estimated period of effectiveness of the quantity of lubricant or a predetermined portion of the estimated period of lubricant effectiveness.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
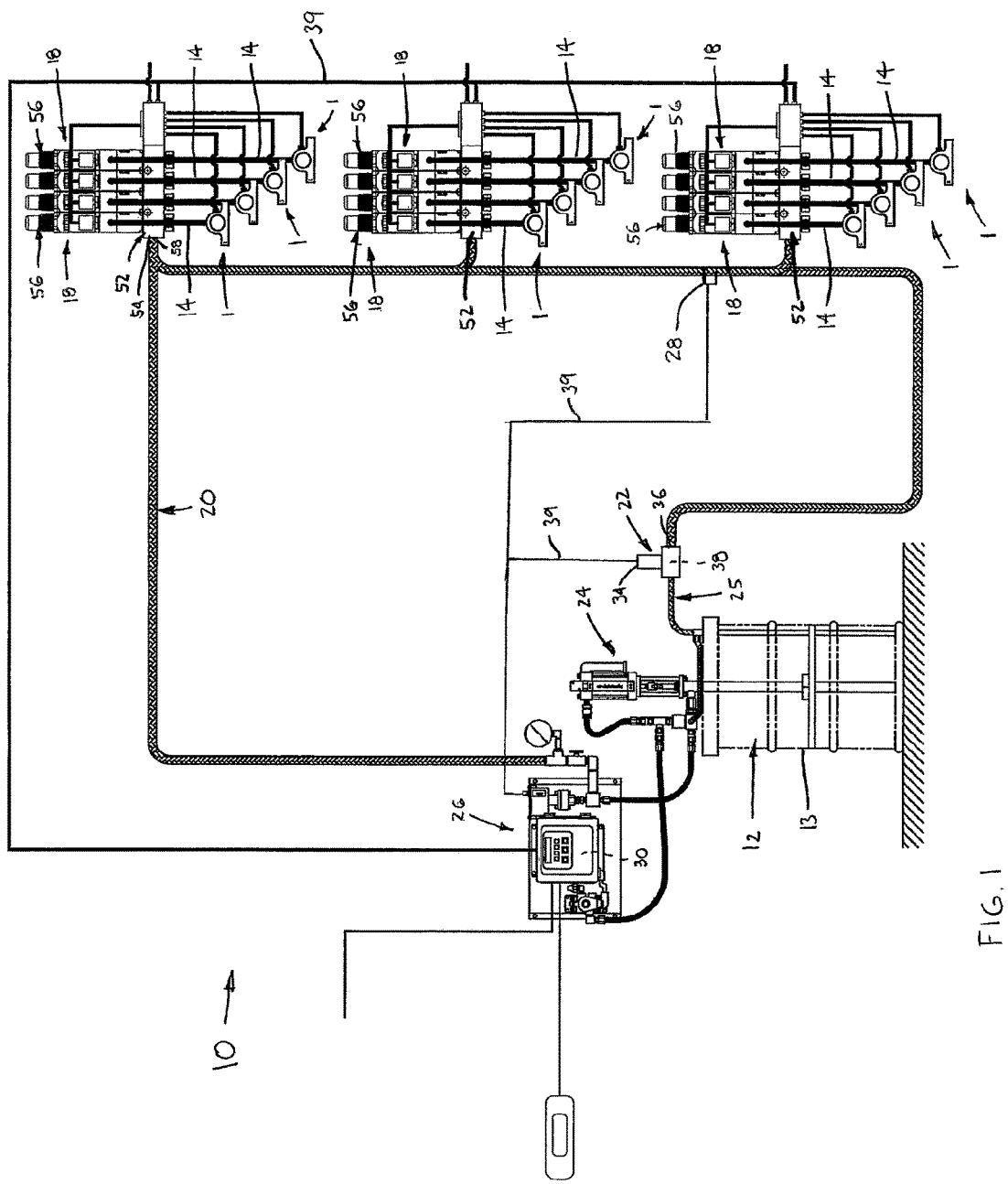
FIG. 1 is a schematic view of a first construction of a lubrication system in accordance with the present invention.
Figure 2:
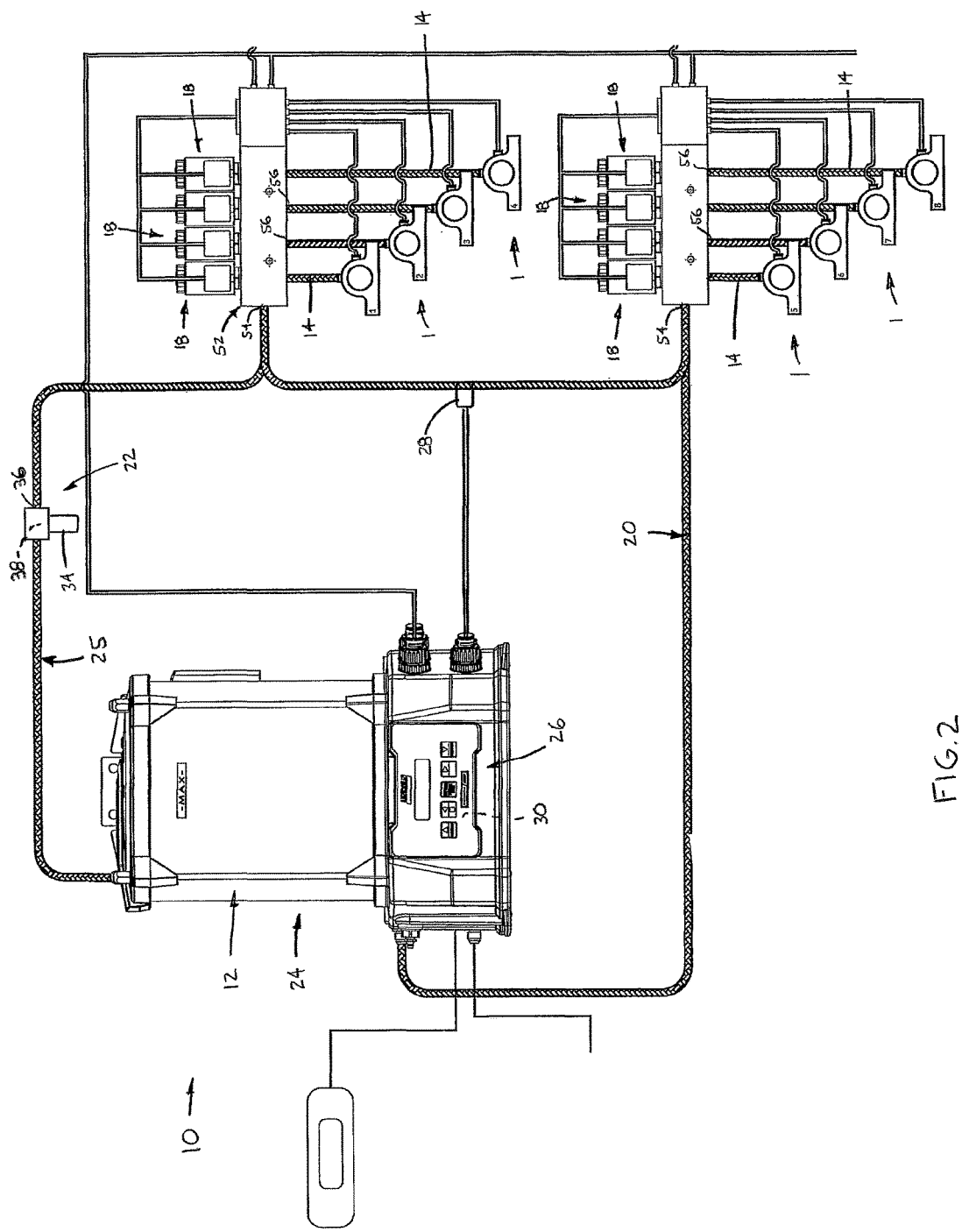
FIG. 2 is a schematic view of a second construction of a lubrication system in accordance with the present invention.
Figure 3:
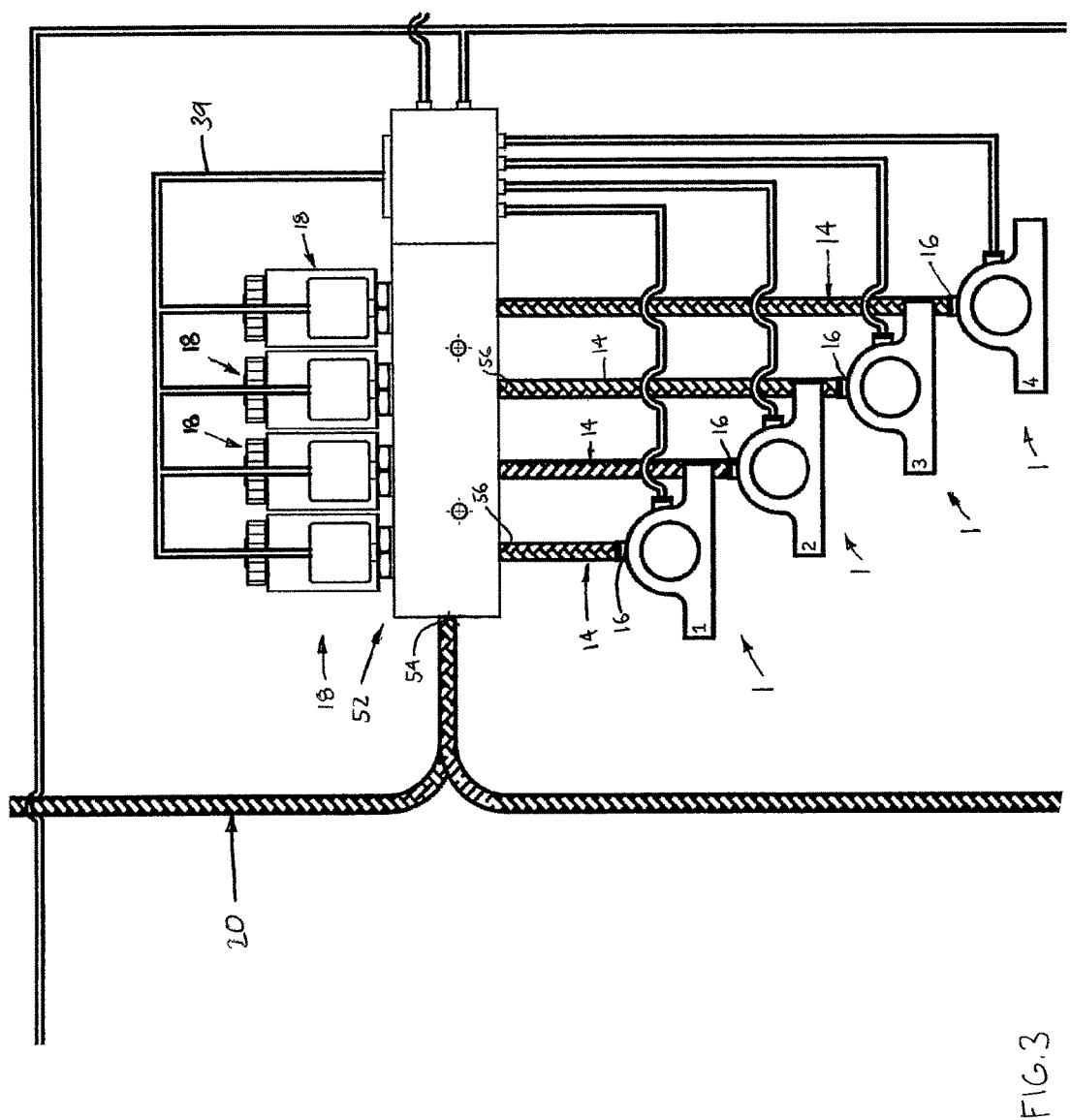
FIG. 3 is a broken-away, enlarged view of a portion of FIG. 2.

Referring now to the drawings in detail, wherein like numbers are used to indicate like elements throughout, there is shown in FIGS. 1-7 a lubrication system 10 for lubricating at least one movable machine component 1, such as a bearing, a gear, etc. The lubrication system 10 basically comprises a lubricant reservoir 12, at least one and preferably a plurality of dispenser lines 14, a dispenser valve 18 associated with each dispenser line 14, a supply line 20, a return valve 22, a pump 24 and a control 26. The reservoir 12 includes a tank 13 or other vessel for holding lubricant, the tank 13 being either an integral part of the pump 24, as shown in FIG. 2, or a separate component fluidly connected with the pump 24, as depicted in FIG. 1. Each dispenser line 14 has an outlet 16 for dispensing lubricant on or within a separate machine component 1 and the associated dispenser valve 18 selectively permits and prevents lubricant flow through the dispenser line 14. The supply line 20 is fluidly coupled with the reservoir 12 and with the dispenser line 14 and directs lubricant from the reservoir to dispenser line 14, and thereafter to the machine component 1. The return valve 22 selectively permits and alternatively prevents lubricant flow from the supply line 20 and back to the reservoir 12, preferably through a return line 25 extending between the valve 22 and the reservoir 12. Further, the pump 24 is fluidly coupled with the supply line 20 and is configured to pump lubricant from the reservoir 12 and through the supply line 20.

Furthermore, the control 26 is operatively connected with the pump 24, with the dispenser valve 18 and with the return valve 22, and preferably includes an electronic controller 30 as described below. The control 26 is configured to operate the pump 24 and the return valve 22 such that a quantity of lubricant $L_Q$ within the supply line 20 flows out of or is purged from the supply line 20, through the return valve 22 and the return line 25, and back into the reservoir 12 when a period of storage $T_S$ within the supply line 20 of the quantity of lubricant $L_Q$ exceeds an estimated period of effectiveness $P_E$ of the quantity of lubricant $L_Q$ or a predetermined portion (e.g., ⅔, ¾, 90%, etc.) of the estimated lubricant effectiveness period $P_E$. Simultaneously or shortly thereafter, the pump 24 dispenses or pumps another, "fresh" quantity of lubricant $L_Q$ into the supply line 20 and the control 26 closes the return valve 22 when the degraded or "expired" quantity of lubricant $L_Q$ has been evacuated from the supply line 20, thereby retaining the fresh lubricant quantity $L_Q$ within the supply line 20. Preferably, the control 26 is also configured to periodically (e.g., once a day, once every five days, etc.) operate the pump 24 and open the return valve 22 to "flush out" the currently stored quantity of lubricant $L_Q$ and replenish the supply line 20 with a fresh quantity of lubricant $L_Q$. Thus, the lubrication system 10 of the present invention prevents degraded or ineffective lubricant from being dispensed on or within the machine components 1 (e.g., bearings, gears, etc.).

As used herein, the terms "period of effectiveness $P_E$" and "lubricant effectiveness period $P_E$" each mean a period of time during which a particular quantity of lubricant $L_Q$ remains at least generally capable of effectively lubricating a particular machine component 1. In other words, the "period of effectiveness $P_E$" and "lubricant effectiveness period $P_E$" each mean an estimated time interval from the point in time at which a "fresh" quantity of lubricant $L_Q$ has been dispensed into the supply line 20 to a point in time at which the particular lubricant quantity $L_Q$ will have degraded to the extent of becoming at least generally ineffective (or the effectiveness has diminished substantially) to lubricate the machine component 1. Clearly, the period of effectiveness or lubricant effectiveness period $P_E$ of lubricant within a supply line 20 should be substantially greater than the life of a quantity of lubricant within or on a machine component 1 that is operational or in use. In any case, as discussed below, the period of effectiveness $P_E$ is preferably determined from empirical data and varies due to the operational conditions within the supply line 20 (e.g., ambient temperature, lubricant pressure, etc.) and the material properties (e.g., rheological, chemical, etc.) of the particular lubricant.

Figure 4:
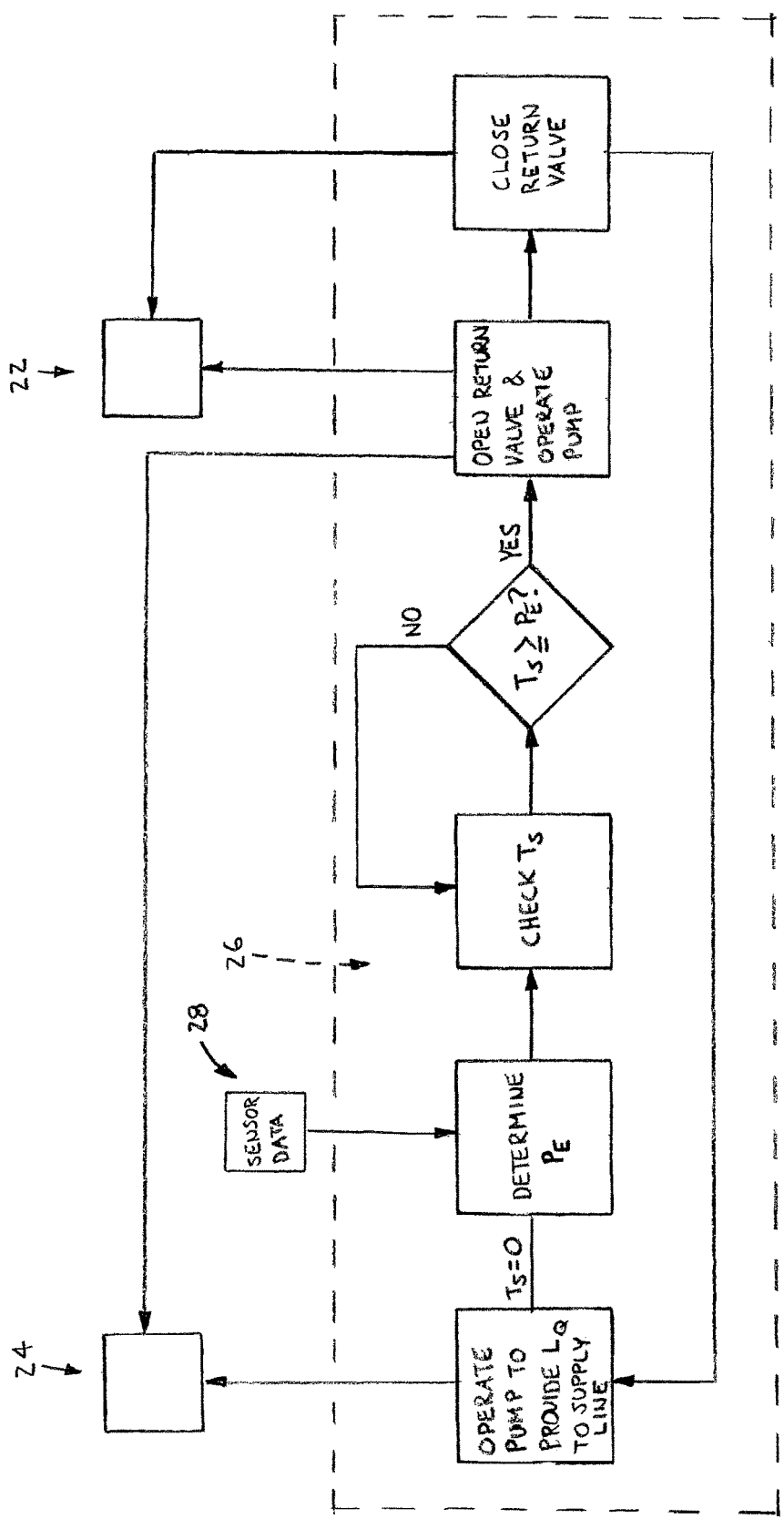
FIG. 4 is a flow diagram depicting a control process for operating a pump and return valve to fill a supply line with fresh lubricant and evacuate degraded lubricant from the supply line.

Referring particularly to FIG. 4, the control 26 is configured to continuously monitor the time after each quantity of lubricant $L_Q$ enters the supply line 20 to determine the storage period $T_S$. The control 26 is also configured to determine the estimated lubricant effectiveness period $P_E$ of each quantity of lubricant $L_Q$ dispensed or delivered into the supply line 20, but may alternatively use a stored, constant value for the lubricant effectiveness period $P_E$, (i.e., derived empirically or estimated for the particular lubrication system 10). Most preferably, the lubrication system 10 further comprises at least one sensor 28 coupled with the control 26 and configured to sense a property of the quantity of lubricant $L_Q$ within the supply line 26. With such a sensor 28, the control 26 is configured to use lubricant property information from the sensor 28 to determine the estimated lubricant effectiveness period $P_E$. The sensor 28 is preferably either a temperature sensor, preferably located within an area of the facility or plant where the temperature is highest, or a pressure sensor located proximal to the pump 24. However, the one or more sensors 28 may alternatively be any other appropriate type of sensor monitoring another lubricant property, such as density, etc., and the system 10 may include two or more sensors 28 of any appropriate type.

Preferably, the control 26 is configured to determine or calculate the lubricant effectiveness period $P_E$ using both information from the sensors 22 and empirically-derived data stored within memory of the control 26. Such empirical data may be generated by measuring the time period between the point in time at which a quantity of "fresh" (i.e., unused) lubricant is provided or delivered into a supply line 20 until the point in time at which the particular quantity of lubricant has degraded to the extent of being generally ineffective to lubricate, or at least the lubrication effectiveness has diminished significantly, as discussed above. The data is preferably generated for each one of a plurality of different sets or combinations of operating conditions, such as different operating or ambient temperatures to which the supply line 20 is exposed, differing lubricant pressures within the supply line 20, and for any other relevant variable operating condition or parameter, and the data is stored within the control 26. Using such empirically-derived data stored within electronic memory, the control 26 is configured (i.e., by means of stored software, wiring, etc.) to determine or select the lubricant effectiveness period $P_E$ based upon information from the sensor(s) 28 at the time the quantity of lubricant $L_Q$ is delivered from the lubricant reservoir 12 into the supply line 20. However, the lubricant effectiveness period $P_E$ may be determined by any other appropriate means or may be a predetermined, constant value as discussed above.

More specifically, the control 26 preferably includes an electronic controller 30, which has electronic memory and a software program stored in the memory. The controller software program is configured (i.e., by software code) to monitor the lubricant storage period $T_S$, to compare the storage period $T_S$ with the lubricant effectiveness period $P_E$ and to operate the pump 24 and return valve 22, as described above and depicted in FIG. 4. The controller software preferably determines or calculates the lubrication effectiveness period $P_E$ (as discussed above) and performs all control functions described above or discussed below, such as opening and closing the valves 18 and 22, operating the pump 24, etc. The control 26 may also be configured to update the value of the lubricant effectiveness period $P_E$, prior to the expiration of the initially determined or calculated period, at one or more "sampling periods" consisting of a portion of the initially determined period $P_E$. For example, the control 26 may "re-determine" or recalculate the lubricant effectiveness period $P_E$ at one sampling period at about one-half of the value of $P_E$, two sampling periods at about one-third and two-thirds of $P_E$, etc. As such, the quantity of lubricant $L_Q$ may purged from the supply line 20 at an earlier time (e.g., due to ambient temperature increase) or at a later time (e.g., for decreasing ambient temperature) than the initial estimated lubricant effectiveness period $P_E$.

Preferably, the memory of the control 26 also includes stored information concerning the fluid supply line 20 (e.g., lubricant capacity, length, etc.), properties of the specific type of lubricant (preferably a type of grease), for example, rheological properties of the lubricant, empirically derived lubricant effectiveness periods $P_E$ within the supply line 20, and any other information that the control 26 utilizes to determine or calculate lubricant effectiveness period $P_E$. Further, the control 26 is preferably either a separate master controller, as shown in FIG. 1, or a controller integral with the pump 24, as depicted in FIG. 2. Although preferably being a digital electronic controller with stored software, the control 26 may alternatively be an analog electronic controller or any other appropriate type of control.

Figure 5:
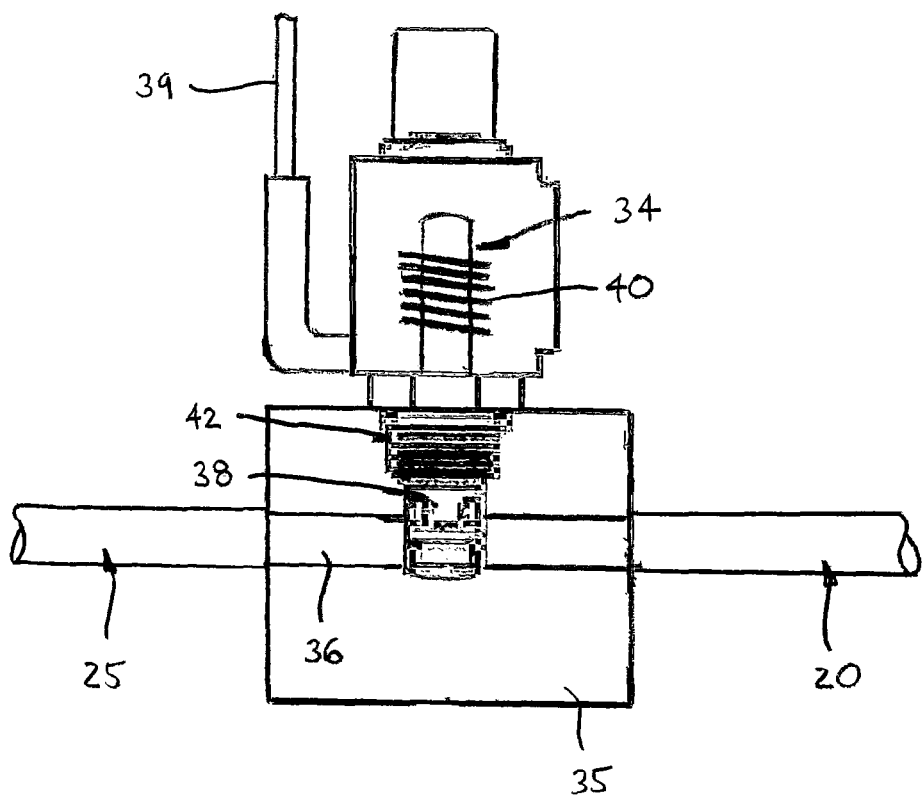
FIG. 5 is a cross-sectional view of an exemplary construction of a return valve.

Referring to FIGS. 1, 2 and 5, the return valve 22 is preferably a normally closed valve that includes an electric actuator 34 for opening and closing the valve 22, the valve actuator 34 being electrically connected with the preferred electronic controller 30. More specifically, the return valve 22 includes a valve body 35 with an internal passage 36 fluidly coupling the lubricant supply line 20 with the lubricant reservoir 12 and a closure element 38 at least partially disposed within the body 35, as best shown in FIG. 5. The closure element 38 is movable between a closed position at which lubricant flow through the valve passage 36 is obstructed and an open position at which lubricant flow through the valve passage 36 is permitted. When the return valve passage 36 is open, the supply line 20 is fluidly connected with the return line 25, and thus to the reservoir 12, to permit older or degraded lubricant to be evacuated from the supply line 20 and flow back to the reservoir 12 (i.e., while "fresh" lubricant is pumped into the supply line 20).

Preferably, the valve actuator 34 is a solenoid 40 for displacing the closure element 38 between the closed and open positions and is operatively connected with the control 26, preferably through a bus line 39, such that the control 26 initiates displacement of the closure element 38 from the closed position to the open position. Further, the valve 22 preferably includes a biasing member 42, such as a spring, for returning the closure element 38 to the closed position when the solenoid 40 is deactivated. Although preferably formed as a normally-closed, solenoid actuated valve, the return valve 22 may be constructed as any other appropriate type of valve, such as for example, a rotatable ball valve, a motor-driven stem valve, etc., and the scope of the present invention is in no manner limited to any particular structure of the valve 22.

Figure 7:
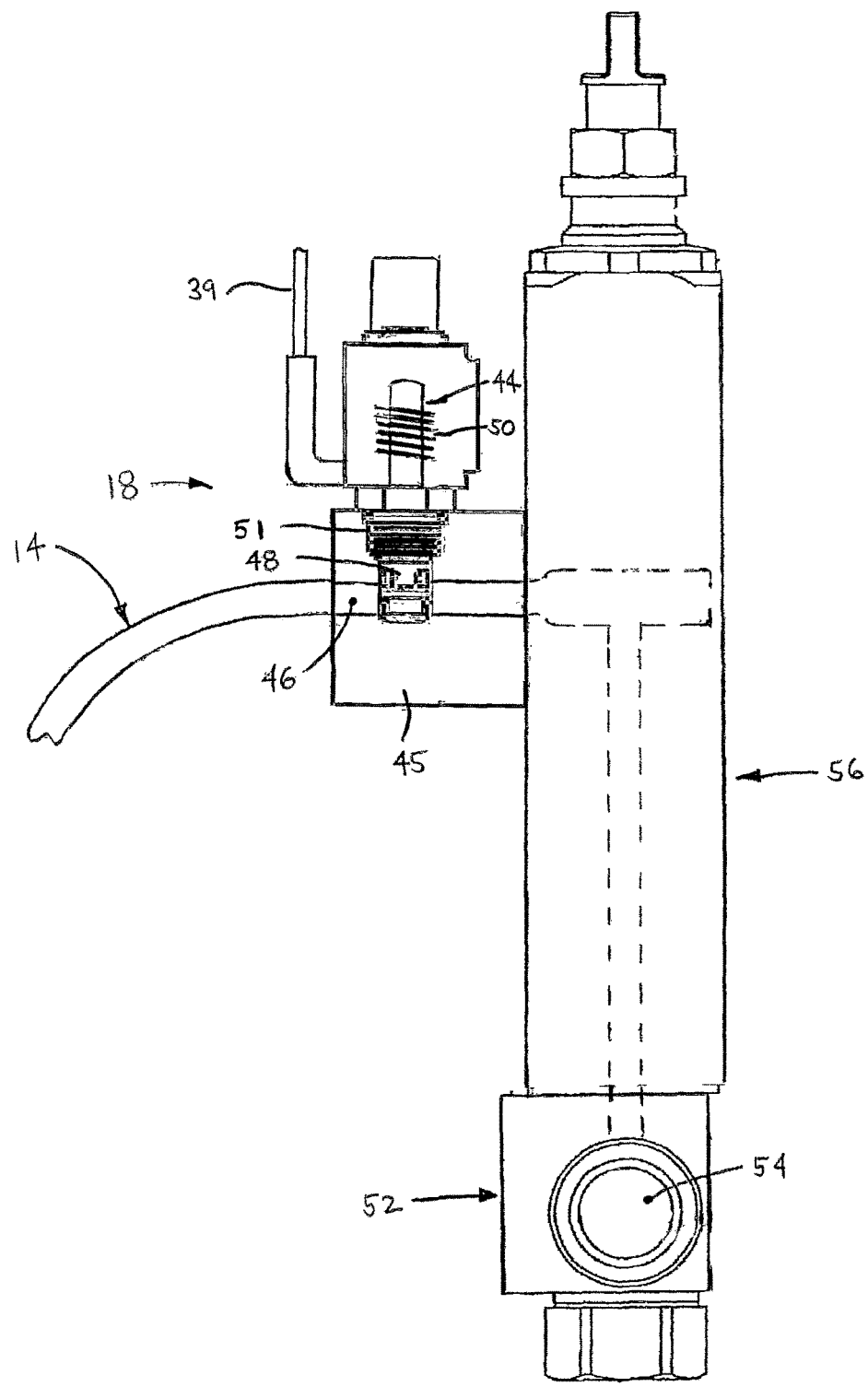
FIG. 7 is a partly-broken away, cross-sectional view through one dispenser valve and injector shown in FIG. 6.

Referring particularly to FIG. 7, each one of the dispenser valves 18 is preferably a normally-closed valve such that lubricant flow is prevented through all of the dispenser lines 14 when the return valve 22 directs flow to the reservoir 12. More specifically, each dispenser valve 18 preferably includes an electric actuator 44 for opening and closing the valve 18, the valve actuator 44 being electrically connected with the preferred electronic controller 30, preferably through a bus line 39. As with the return valve 22, each dispenser valve 18 is preferably a solenoid-operated valve including a valve body 45 with an internal passage 46 and a closure element 48 disposed at least partially within the body 45. The closure element 48 is movable between an open position, at which lubricant flow through the passage 46 is permitted and a closed position, at which lubricant flow through the passage 46 is prevented. The actuator 44 is preferably a solenoid 50 connected with and configured to displace the closure element 48 to the open position, and the valve 18 preferably further includes a biasing member 51, such as a spring, for returning the closure element 48 to the closed position. Although preferably formed as a normally-closed, solenoid actuated valve, each dispenser valve 18 may be formed in any other appropriate manner, such as a rotatable ball valve, a motor-driven stem valve, etc.

Figure 6:
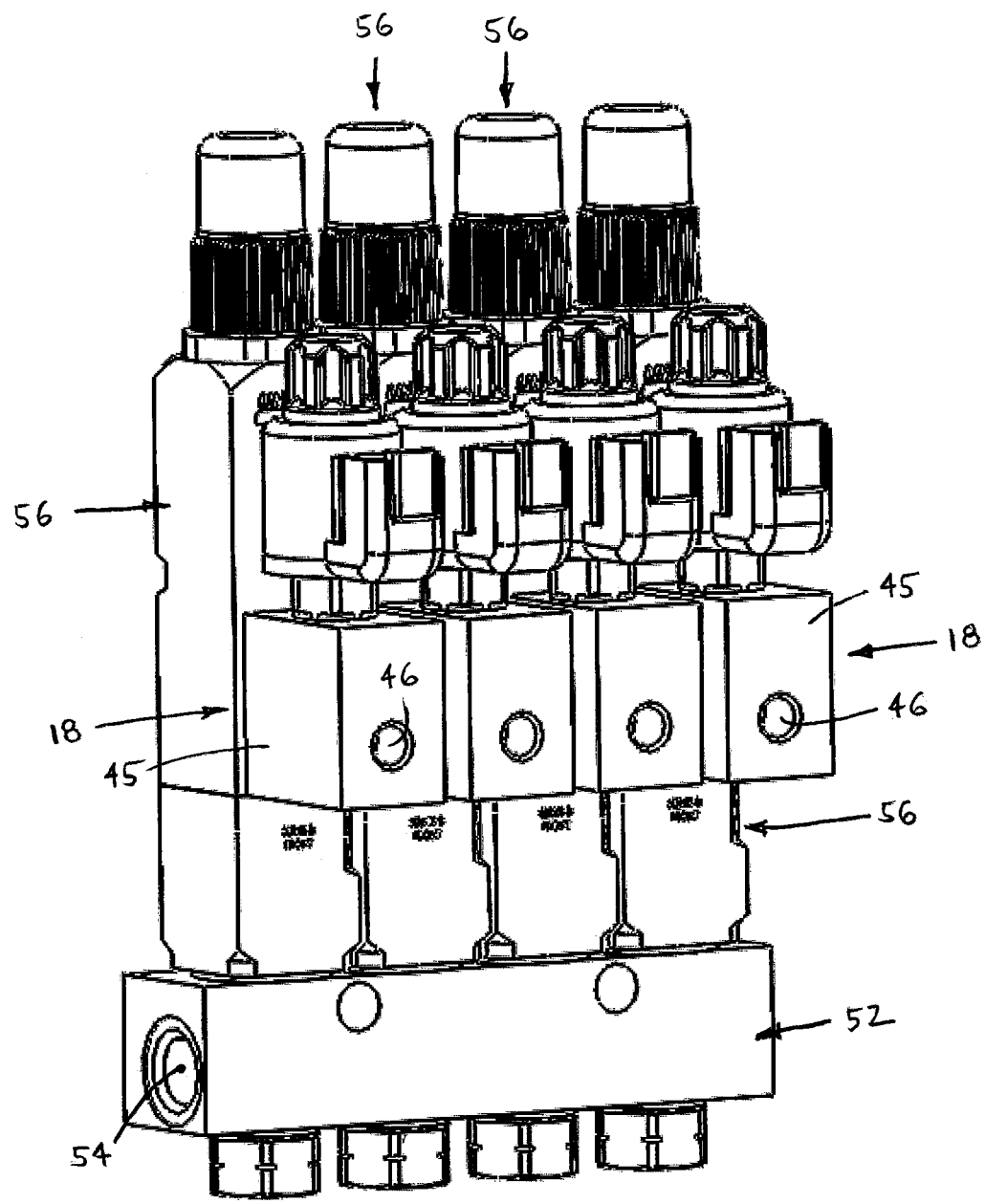
FIG. 6 is a perspective view of a plurality of a presently preferred type of dispenser valve each shown in combination with an injector and mounted to a manifold.

Referring now to FIGS. 1-3, 6 and 7, when the lubrication system 10 includes a plurality of dispenser lines 14 and valves 18, the lubrication system 10 preferably further comprises one or more manifolds 52 to which two or more dispenser valves 18 are mounted (FIGS. 2 and 3) or are fluidly connected (FIGS. 1, 6 and 7). Each manifold 52 has a passage 54 for fluidly coupling the supply line 20 with the valve passages 46 of two or more dispenser valves 18. With such manifolds 52, lubricant within the supply line 20 upstream of the manifold 52 will flow through the manifold passage 54 and back to the supply line 20 when the dispenser valves 18 remain closed while the return valve 22 is opened. Further, as best shown in FIGS. 1, 6 and 7, in certain constructions, the lubrication system 10 preferably further includes one or more injectors 56 each mounted to one of the manifolds 52 and fluidly coupling the manifold 52 with a connected one of the dispenser valves 18. In such embodiments, each dispenser valve 18 is mounted to one injector 56, thereby connecting the valve 18 to the manifold 52, and each injector 56 is configured to provide a predetermined or "measured" quantity of lubricant from the manifold passage 52 to the dispenser valve passage 46, for subsequent delivery of the lubricant quantity to the associated machine component 1.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined herein and in the appended claims.

I claim:

1. A lubrication system for lubricating at least one movable machine component, the system comprising;
   a lubricant reservoir containing lubricant;
   a dispenser line having an outlet for discharging lubricant on or within the machine component;
   a dispenser valve selectively permitting lubricant flow through the dispenser line;
   a supply line fluidly coupled with the reservoir and with the dispenser line;
   a return valve selectively permitting lubricant flow from the supply line to the reservoir;
   a pump fluidly coupled with the supply line and configured to pump lubricant from the reservoir and through the supply line; and
   a control operatively connected with the pump and with the return valve, the control being configured to monitor a time after a quantity lubricant enters the supply line to determine a period of storage within the supply line and to operate the pump and the return valve such that the quantity of lubricant within the supply line flows out of the supply line and into the reservoir when the period of storage within the supply line of the quantity of lubricant exceeds an estimated period of effectiveness of the quantity of lubricant or a predetermined portion of the estimated lubricant effectiveness period so as to prevent degraded or ineffective lubricant from being dispensed on or within the machine component.

2. The lubrication system as recited in claim 1 wherein the control is configured to determine the estimated lubricant effectiveness period of the quantity of lubricant.

3. The lubrication system as recited in claim 2 further comprising a sensor coupled with the control and configured to sense a property of the quantity of lubricant, the control being configured to use lubricant property information from the sensor to determine the estimated lubricant effectiveness period.

4. The lubrication system as recited in claim 3 wherein the sensor is one of a temperature sensor and a pressure sensor.

5. The lubrication system as recited in claim 1 wherein the control is an electronic controller having memory and a software program stored in the memory, the program being configured to monitor the lubricant storage period, to compare the storage time with the lubricant effectiveness period and to operate the pump and return valve when the when period of storage within the supply line of the quantity of lubricant exceeds an estimated period of effectiveness of the quantity of lubricant or a predetermined portion of the estimated period of lubricant effectiveness.

6. The lubrication system as recited in claim 5 wherein the return valve includes an electric actuator for opening and closing the valve, the actuator being electrically connected with the electronic controller.

7. The lubrication system as recited in claim 6 wherein the return valve includes a passage fluidly coupling the lubricant supply line with the lubricant, a closure element movable between a closed position at which lubricant flow through the valve passage is obstructed and an open position at which lubricant flow through the valve passage is permitted, and a solenoid for displacing the closure element between the closed and open positions, the solenoid being operatively connected with the control so as to initiate displacement of the closure element from the closed position to the open position.

8. The lubrication system as recited in claim 1 wherein the dispenser valve is a normally closed valve such that lubricant flow is prevented through the dispenser line when the return valve directs flow to the reservoir.

9. The lubrication system as recited in claim 1 wherein the reservoir includes a tank, the tank being one of integral with the pump and fluidly connected with the pump.

10. The lubrication system as recited in claim 1 further comprising a manifold with a passage fluidly connected with the supply line and with the dispenser valve, the dispenser valve being connected with the manifold.

11. A method of operating a lubrication system for lubricating at least one movable machine component, the system including a lubricant reservoir, a dispenser line having an outlet for discharging lubricant on or within the machine component, a dispenser valve selectively permitting lubricant flow through the dispenser line, a supply line fluidly coupled with the reservoir and with the dispenser line, a return valve selectively permitting lubricant flow from the supply line to the reservoir, and a pump for pumping lubricant and through the supply line, the method comprising the steps of:
monitoring a time of storage of a quantity of lubricant within the supply line;
comparing the lubricant storage time with an estimated period of effectiveness of the quantity of lubricant; and
operating the pump and opening the return valve when the storage period exceeds an estimated period of effectiveness of the quantity of lubricant or a predetermined portion of the estimated period of lubricant effectiveness so as to prevent degraded or ineffective lubricant from being dispensed on or within the machine component.

12. The method as recited in claim 11 further comprising the step of determining the estimated lubricant effectiveness period.

13. The method as recited in claim 12 wherein the lubrication system includes a sensor monitoring a property of the quantity of lubricant within the supply line and the step of determining the estimated lubricant effectiveness period includes receiving property information from the sensor and using the property information to determine the estimated lubricant effectiveness period.

14. A lubrication system for lubricating at least one movable machine component, the system comprising;
a lubricant reservoir containing lubricant;
a dispenser line having an outlet for discharging lubricant on or within the machine component;
a dispenser valve selectively permitting lubricant flow through the dispenser line;
a supply line fluidly coupled with the reservoir and with the dispenser line;
a return valve selectively permitting lubricant flow from the supply line to the reservoir;
a pump fluidly coupled with the supply line and configured to pump lubricant from the reservoir and through the supply line; and
a control operatively connected with the pump and with the return valve, the control being configured to monitor a time after a quantity lubricant enters the supply line to determine a period of storage within the supply line and to operate the pump and the return valve such that the quantity of lubricant within the supply line flows out of the supply line and into the reservoir when the period of storage within the supply line of the quantity of lubricant exceeds an estimated period of effectiveness of the quantity of lubricant or a predetermined portion of the estimated lubricant effectiveness period so as to prevent degraded or ineffective lubricant from being dispensed on or within the machine component;
wherein the control is an electronic controller having memory and a software program stored in the memory, the program being configured to monitor the lubricant storage period, to compare the storage time with the lubricant effectiveness period and to operate the pump and return valve when the when period of storage within the supply line of the quantity of lubricant exceeds the estimated period of effectiveness of the quantity of lubricant or the predetermined portion of the estimated period of lubricant effectiveness.

15. A lubrication system for lubricating at least one movable machine component, the system comprising;
a lubricant reservoir containing lubricant;
a dispenser line having an outlet for discharging lubricant on or within the machine component;
a dispenser valve selectively permitting lubricant flow through the dispenser line;
a supply line fluidly coupled with the reservoir and with the dispenser line;
a return valve selectively permitting lubricant flow from the supply line to the reservoir;
a pump fluidly coupled with the supply line and configured to pump lubricant from the reservoir and through the supply line;
a control operatively connected with the pump and with the return valve, the control being configured to monitor a time after a quantity lubricant enters the supply line to determine a period of storage within the supply line and to operate the pump and the return valve such that the quantity of lubricant within the supply line flows out of the supply line and into the reservoir when the period of storage within the supply line of the quantity of lubricant exceeds an estimated period of effectiveness of the quantity of lubricant or a predetermined portion of the estimated lubricant effectiveness period so as to prevent degraded or ineffective lubricant from being dispensed on or within the machine component; and a sensor coupled with the supply line and with the control, the sensor being configured to sense a property of the quantity of lubricant within the supply line and the control being further configured to use lubricant property information from the sensor to determine the estimated lubricant effectiveness period.

* * * * *